Jan. 8, 1963        H. H. ROGERS        3,071,852
METHOD OF FUSION BONDING WITH A NITROGEN TRIFLUORIDE FLAME
Filed March 1, 1957
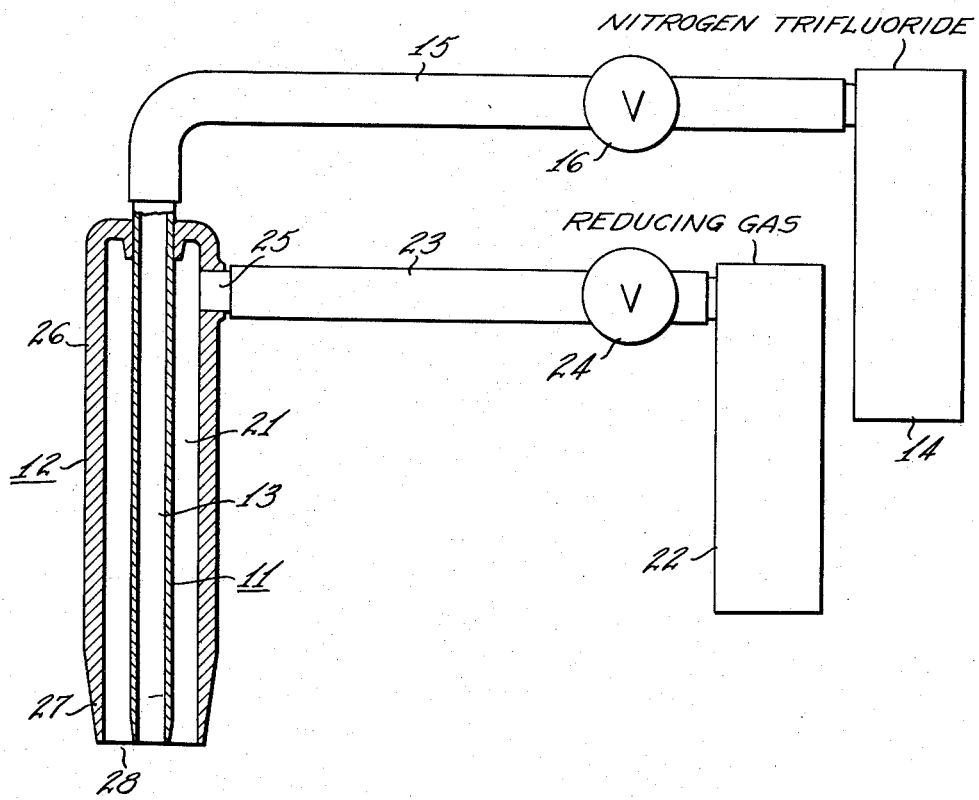
Inventor
Howard H. Rogers
by Richard R. Mybeck
Attorney

United States Patent Office 3,071,852
Patented Jan. 8, 1963

3,071,852
METHOD OF FUSION BONDING WITH A NITROGEN TRIFLUORIDE FLAME
Howard H. Rogers, Milwaukee, Wis., assignor to Allis-Chalmers Manufacturing Company, Milwaukee, Wis.
Filed Mar. 1, 1957, Ser. No. 643,414
10 Claims. (Cl. 29—470)

The present invention relates to the art of uniting parts by fusion, such as by welding or brazing, and more particularly to a new torch for effecting such fusion.

During the past several years considerable money and research talent have been diverted by industry to the development of a torch which will provide first quality welds and brazes for the high temperature materials in a clean and efficient manner.

Some of this development work, for example, was carried on at the War Research Laboratories of Columbia University, reported by Homer F. Priest and Aristed V. Grosse in the March 1947 issue of Industrial and Engineering Chemistry, and resulted in their hydrogen fluorine torch.

That torch, while having advantages over what had been known theretofore, possessed a serious disadvantage because the fluorine gas it utilized was extremely hazardous at room temperature.

Another high temperature welding device is the atomic hydrogen torch but it is characterized by the disadvantageous requirement of extraordinary electric supply and power.

Other similar torches have been developed but they are generally characterized by failing to attain sufficiently high temperatures, by requiring special paste or solid fluxes which leave a substantial residue on the junction, or both. As such, these torches possess shortcomings which render them undesirable for many applications in the art.

Thus, I undertook to discover a completely new material for torches of the type described which would enable me to realize or exceed the desirable characteristics of the prior art torches while overcoming their undesirable qualities. It is my discovery of nitrogen trifluoride as such a material which provides the heart of the present invention.

Accordingly, one of the primary objects of the present invention is to provide an improved torch of the type described which realizes and exceeds the desirable qualities of prior art torches while overcoming their deficiencies.

Another object of the present invention is to provide an improved torch of the type described utilizing nitrogen trifluoride.

A still further object of the present invention is to provide an improved torch of the type described having nitrogen trifluoride as its oxidant mixed with a suitable reducing gas or vapor, such as hydrogen, diborane, hydrazine, natural gas, ammonia or a mixture of these or these with other suitable gases.

A still further object of the present invention is the provision of an improved cutting torch in which the cutting gas consists essentially of nitrogen trifluoride.

A still further object of the present invention is the provision of a new torch in which the constituents are relatively inert and noncorrosive at normal temperatures.

A still further object of the present invention is the provision of a new torch of the type described comprising an oxidant and a fuel which can be premixed without special precautions to prevent ignition.

A still further object of the present invention is the provision of a new torch of the type described which avoids, by its own self-fluxing action, the use of solid, paste, or liquid fluxes and the deleterious residues they leave.

An even further object of the present invention is the provision of a new torch of the type described which utilizes a unique gaseous material characterized by its oxidizing and fluxing properties which can be used with or separately of the torch.

These objects, and still further objects, are fulfilled by the present invention in a manner which is apparent from the following detailed description in connection with the accompanying drawing.

The drawing is a schematic vertical elevation, partially in cross section, of a suitable welding device for effectively utilizing one embodiment of the present invention.

The present invention generally comprises the provision of a self-fluxing nonelectric torch comprising nitrogen trifluoride as its oxidant and a suitable reducing gas selected from the group consisting of diborane, hydrogen, ammonia, hydrazine, and natural gas. While in its preferred form, the present invention will preferably avoid the hydrocarbon fuels having high carbon content, such as acetylene, benzene, etc., these fuels may be used in the practice of the present invention when their potential disadvantages (e.g., they may deposit carbon and they burn so very brightly that the torch operator may not be able to see what he is doing) are not a problem to a particular fabrication.

Referring to the drawing, the illustrated device comprises a plurality of nested generally concentric tubes, 11 and 12, consisting of a suitable noncorrosive material, such as copper, nickel, their alloys, and the like. Tube 11, disposed within tube 12 and in spaced relationship thereto, defines a tubular passageway 13 which is connectable to supply source 14 by conduit 15 and valve 16. In the illustrated embodiment, supply source 14 contains nitrogen trifluoride.

Tube 11 and tube 12 coact to define annular passage 21 which is connectable to supply source 22 by conduit 23 and valve 24. Nipple 25, defined in tube 12 and extending outwardly therefrom, insertably engages conduit 23 to provide communication between tube 12 and conduit 23. In the illustrated embodiment, supply source 22 contains a reducing gas, such as hydrogen.

Tube 12 comprises a cylindrical portion 26 and a frustoconical portion 27, frustoconical portion 27 being so disposed relative to tube 11 to define a mixing nozzle 28 therewith for blending the torch components and effecting the desired results of the illustrated embodiment.

Considering the embodiment of the present invention in which hydrogen is utilized as the reducing gas, nitrogen trifluoride and hydrogen are fed to the device from pressure storage cylinders or sources of supply 14, 22, through conduit 15, 23, respectively. The flow rate, and consequently the fuel mixture of the gases passing through nozzle 28, is determined by valves 16, 24. Conventional brass needle valves have been found quite satisfactory for nitrogen trifluoride. Nitrogen trifluoride in its pure form is relatively noncorrosive so that an equipment suitable for handling oxygen is equally suitable for nitrogen trifluoride.

In burning nitrogen trifluoride and hydrogen, I find that I obtain almost twice as much heat as was obtainable from the hydrogen oxygen torches used heretofore.

The nitrogen trifluoride of the present invention, in addition to being especially suited to the high temperature torch herein described, is well suited to a cutting torch because very little heat is absorbed by the decomposition of nitrogen trifluoride into nitrogen and fluorine.

Ammonia likewise provides extremely satisfactory results with nitrogen trifluoride in a torch of the present invention. The results obtained were quite similar to those obtained when hydrogen and nitrogen trifluoride were used.

The nitrogen trifluoride torch of the present invention further provides a tremendous advantage over those torches utilizing fluorine or other fluorine containing oxidants because nitrogen trifluoride is easier and safer to handle and it is relatively chemically inert at room temperatures.

With the cutting torch of my present invention, I have successfully cut a variety of materials, typical of which are cast iron, nodular iron, 3.25 percent silicon steel, mild steel, copper, 18–8 stainless steel, and titanium carbide.

When cutting with the nitrogen trifluoride cutting torch of the present invention, the actual cutting action generally commences after the metal has become red hot, i.e., reaches a dull to bright red color. When hydrogen is the fuel utilized in connection with the cutting torch, the cutting action of the nitrogen trifluoride continues after the hydrogen has been shut off.

Utilizing my improved torch as a welding instrument, I have made successful welds without using any auxiliary fluxes with several pairs of metals heretofore thought extremely difficult to weld with nonelectrical apparatus. The following are typical: Chromel P (90 percent Ni, 10 percent Cr) to Alumel (95 Ni; remainder Si, Mn, Al); Kanthal A (23.4 Cr; 6.2 Al; 1.9 Co; 0.06 C; remainder Fe) to Kanthal A; nickel to molybdenum; Nichrome (60 Ni; 16 Cr; 24 Fe) to tungsten; and Stellite No. 6 (55 Min. Co.; 33 max. Cr; 6 max. W; 7.5 max. Fe) to Stellite No. 6. I have obtained only modest results in attempting to weld 18–8 stainless steel.

The inflammability limits for mixtures of nitrogen trifluoride and hydrogen have been roughly determined as being that of the same order or magnitude of the mixture of hydrogen and oxygen, while the inflammability limits for mixtures of nitrogen trifluoride and ammonia are wider than those reported for ammonia and oxygen.

When a significant amount of nitrogen trifluoride is added to the oxygen supply of conventional oxyhydrogen torch the nitrogen fluoride provides a complete fluxing action and no additional flux is required. For example, when utilizing a nitrogen trifluoride oxygen mixture to weld Kanthal A to Kanthal A, one of the more difficult welds, preferred results of the present invention were obtained with a mixture of 50 percent by weight nitrogen trifluoride (approximately 30 percent by volume).

The torch of the present invention has further provided satisfactory results in brazing such materials as tungsten, 18–8 stainless steel, nickel, and molybdenum with brass; and molybdenum, 18–8 stainless steel, graphite with nickel.

Brazing materials to graphite is a problem which has heretofore been thought literally insurmountable or at least incapable of easy solution. With the torch of the present invention, however, nickel, Chromel A (80 nickel, 20 chromium), Nichrome and ferrosilicon (15 percent iron, 85 percent silicon), have all been successfully brazed to graphite.

Nitrogen trifluoride by itself has been found to be extremely useful as a gaseous flux for welding and brazing. As a gaseous flux it has considerable advantage over the solid, paste, and liquid fluxes heretofore used which leave a deleterious residue of some degree upon the junction of the fused parts. This residue then requires costly handling and special cleaning before further fabrication can be effected. The gaseous flux of the present invention eliminates the use of these residue depositing fluxes and enables high temperature welding operations to be effected in a cleaner and more efficient manner, the larger part of the gaseous flux dispels, passing to the atmosphere rather than residually contaminating the joint.

In utilizing nitrogen trifluoride as a gaseous flux, according to the present invention, one embodiment comprises the following method. Heat the metals which are to be welded or brazed by any conventional means, such as with oxyacetylene, oxyhydrogen, or an electric arc. When the metals have been heated high enough to be fused, the torch or arc is removed and a nitrogen trifluoride stream is directed at the area being welded or brazed. Because of the high temperatures necessary, the method is particularly practical with high melting metals or brazing materials. The nitrogen trifluoride, upon hitting the heated metals, probably forms metal fluorides in reactions with the hot metal or metal oxide surfaces. The reaction of the nitrogen trifluoride with the metal provides additional heat for further effecting the fused joints.

While the present invention has been described with relation to several specific embodiments, it is understood that the present invention is not to be so limited. Rather, such modifications and variations as may readily occur to one skilled in the art having knowledge of the present teaching are intended to be included within the scope of the present invention, it being limited only by the scope of the appended claims.

What is claimed is:

1. The method of forming a nonoxidized union between two fusible metal members comprising: directing a continuous flow of a gaseous flux consisting essentially of nitrogen trifluoride upon the fusible metal members concurrently with heating at least one of the members to their fusion temperatures and thereafter placing the members into intimate engagement with each other; removing the flow of gaseous flux from upon the engaged members; and cooling the engaged members to form a solidified integral bond therebetween.

2. The method of fluxing the preparation and formation of fusion unions of metal members comprising directing a continuous flow of a fluid consisting essentially of nitrogen trifluoride upon the contacting surfaces of said metal members and concurrently applying fusing heat thereto.

3. A self-fluxing method of fusing metal in a fusion bonding process comprising heating the metal to a fusion temperature by the combustion of nitrogen trifluoride and at least one gas selected from the group consisting of hydrogen, diborane, ammonia, hydrazine and natural gas.

4. A self-fluxing method of fusing metal in a fusion bonding process comprising heating the metal to a fusion temperature by the combustion of nitrogen trifluoride and hydrogen.

5. A self-fluxing method of fusing metal in a fusion bonding process comprising heating the metal to a fusion temperature by the combustion of nitrogen trifluoride and diborane.

6. A self-fluxing method of fusing metal in a fusion bonding process comprising heating the metal to a fusion temperature by the combustion of nitrogen trifluoride and ammonia.

7. A self-fluxing method of fusing metal in a fusion bonding process comprising heating the metal to a fusion temperature by the combustion of nitrogen trifluoride and hydrazine.

8. A self-fluxing method of fusing metal in a fusion bonding process comprising heating the metal to a fusion temperature by the combustion of nitrogen trifluoride and natural gas.

9. The method of claim 1 in which the concurrent heating of said member is effected by the combustion of nitrogen trifluoride with at least one gas selected from the group consisting of hydrogen, diborane, ammonia, hydrazine, natural gases and other hydrocarbon fuel gases.

10. The method of joining fusible metal parts comprising forming a combustible mixture of a reducing gas selected from the group consisting of hydrogen, diborane, ammonia, hydrazine, natural gases and other hydrocarbon fuel gases and an oxidant consisting essentially of nitrogen trifluoride; igniting said mixture to form a flame; adjusting the amount of said oxidant in said mixture to provide said flame with a temperature sufficient to fuse the metal parts; engaging said parts with each other and said flame to fuse said parts in the absence of conventional fluxing materials; and withdrawing said flame from said parts whereupon a self-fluxed integrally fused part is formed.

References Cited in the file of this patent

UNITED STATES PATENTS

| | | |
|---|---|---|
| 2,205,499 | Smith | June 25, 1940 |
| 2,421,649 | Priest et al. | June 3, 1947 |
| 2,517,622 | Babcock | Aug. 8, 1950 |
| 2,561,565 | Edson et al. | July 24, 1951 |
| 2,561,566 | Edson et al. | July 24, 1951 |
| 2,570,869 | Schmidt | Oct. 9, 1951 |
| 2,582,268 | Nerad | Jan. 15, 1952 |
| 2,642,656 | Grosse | June 23, 1953 |
| 2,774,136 | Schechter | Dec. 18, 1956 |
| 2,805,148 | DeLong | Sept. 3, 1957 |
| 2,968,145 | Kanarek | Jan. 17, 1961 |

OTHER REFERENCES

Journal of the American Rocket Society, December, 1947, pages 2–25, published by the American Rocket Society, Fisher Building, Detroit, Michigan.

Journal of Space Flight, Apr. 1950, Table 2, page 4, published by the Chicago Rocket Soc., 10630 S. Saint Louis Avenue, Chicago 43, Illinois.

Thorpe's Dictionary of Applied Chemistry, fourth edition, volume V, pages 275–277 and volume VIII, page 511, published by Longmans, Green and Company, New York, N.Y.